US012571529B2

(12) United States Patent
Zhang

(10) Patent No.: US 12,571,529 B2
(45) **Date of Patent: *Mar. 10, 2026**

(54) TAP LIGHT

(71) Applicant: Shenzhen Huamingjun Rubber Co., Ltd, Shenzhen (CN)

(72) Inventor: Hongjun Zhang, Shenzhen (CN)

(73) Assignee: Shenzhen Huamingjun Rubber Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/822,515

(22) Filed: Sep. 3, 2024

(65) Prior Publication Data

US 2025/0067424 A1 Feb. 27, 2025

Related U.S. Application Data

(63) Continuation of application No. 18/399,812, filed on Dec. 29, 2023, now Pat. No. 12,117,150.

(30) Foreign Application Priority Data

Aug. 21, 2023 (CN) ........................ 202322254654.4

(51) Int. Cl.

*F21V 23/04* (2006.01)
*F21V 17/16* (2006.01)
*F21V 23/06* (2006.01)
*F21V 31/00* (2006.01)

(52) U.S. Cl.

CPC ........ *F21V 23/0471* (2013.01); *F21V 17/164* (2013.01); *F21V 23/06* (2013.01); *F21V 31/005* (2013.01)

(58) Field of Classification Search

CPC .... F21V 23/0471; F21V 17/164; F21V 23/06; F21V 31/005; F21V 23/04; F21V 23/0464; F21Y 2115/10

See application file for complete search history.

(56) References Cited

U.S. PATENT DOCUMENTS 5,375,839 A * 12/1994 Pagani .................. A63B 43/00 473/570
6,117,030 A * 9/2000 Green, Sr. .............. A63B 43/06 473/570
6,135,850 A * 10/2000 Reed ...................... A63H 3/006 446/485
6,155,700 A * 12/2000 Hsu ........................ A63H 17/28 362/253

(Continued)

*Primary Examiner* — Tsion Tumebo

(57) ABSTRACT

The present invention patent relates to the technical field of children's toys, in particular to a tap light. The tap light includes a lamp holder and a lampshade. A side of the lampshade is provided with a first opening that communicates with its internal space. The lamp holder is clamped at the first opening of the lampshade. An annular clamping groove is defined between base bodies for clamping the connection part. Since the annular clamping groove clamps the connection part, the two will form a seal, effectively preventing water from the external environment from entering the tap light through the gap between the lamp holder and the lampshade. Even if the child puts the tap light into the bathtub or basin while playing, or directly rinses the tap light at the sink, it will not cause the tap light to fail due to water ingress.

19 Claims, 10 Drawing Sheets

(56) References Cited

U.S. PATENT DOCUMENTS

| | | | | |
|---|---|---|---|---|
| 7,163,313 | B2 * | 1/2007 | Rosenberg | F21V 15/01 362/186 |
| 9,545,542 | B2 * | 1/2017 | Binder | A63B 71/0622 |
| 10,830,410 | B1 * | 11/2020 | Wei | F21V 23/02 |
| 11,500,277 | B2 * | 11/2022 | Zheng | G03B 21/2066 |
| 2005/0005873 | A1 * | 1/2005 | Gick | A01K 15/025 119/707 |
| 2005/0032457 | A1 * | 2/2005 | Gick | A01K 15/025 446/409 |
| 2011/0012535 | A1 * | 1/2011 | West | F21L 4/005 315/307 |
| 2021/0071846 | A1 * | 3/2021 | Liu | F21V 23/04 |
| 2021/0262638 | A1 * | 8/2021 | Zhao | F21V 11/08 |

* cited by examiner

TAP LIGHT

CROSS REFERENCE TO RELATED APPLICATIONS

The present application is a Continuation application of U.S. application Ser. No. 18/399,812 filed on Dec. 29, 2023, which claims the benefit of Chinese Patent Application No. 202322254654.4 filed on Aug. 21, 2023, the contents of which are incorporated herein by reference in their entirety.

TECHNICAL FIELD

The present invention patent relates to the technical field of children's toys, in particular to a tap light.

BACKGROUND TECHNIQUE

The tap light is a lamp that emits light or changes the light pattern after being tapped. It is mainly used for fun and games for children at home. When children play, they will run around with the tap light. It has been reported by some consumers that the children will put the tap light into the bathtub or basin when the adults pay no attention to them, and even rinses the tap light at the sink, which will cause the tap light to fail due to water ingress.

SUMMARY

The technical problem to be solved by the embodiments of the present invention patent is to provide a tap light to solve the problem in the prior art that children will bring the tap light to a place with water, causing the tap light to fail due to water ingress.

In a first aspect, the embodiments of the present invention patent provide a tap light, including:

- a lamp holder provided with a main control module, a light source assembly and a sensor electrically connected to the main control module, the main control module being used to control the light source assembly to switch gears or colors based on a control signal detected by the sensor; and
- a lampshade, a side of the lampshade being provided with a first opening that communicates with an internal space thereof, the lamp holder being installed at the first opening and defining an accommodation cavity together with the lampshade, and the sensor, the main control module and the light source assembly being all located in the accommodation cavity;
- wherein the lampshade includes a connection part, and the connection part is adjacent to the first opening and is arranged around the first opening; and
- the lamp holder includes a base body and a pressing plate installed on the base body, and an annular clamping groove is formed between the pressing plate and the base body, the annular clamping groove clamping the connection part to sealingly connect the lamp holder and the lampshade.

Furthermore, the base body is provided, on a side facing the pressing plate, with a first annular protrusion; the pressing plate is provided, on a side facing the base body, with a second annular protrusion; the first annular protrusion and the second annular protrusion are spaced apart to form the annular clamping groove between the two; the first annular protrusion encloses to form a first groove communicating with the annular clamping groove; the second annular protrusion encloses to form a second groove communicating with the annular clamping groove; and the connection part is clamped in the annular clamping groove.

Furthermore, the connection part includes: an extension section clamped in the annular clamping groove; a first snap-in section accommodated in the first groove and connected with the extension section; and a second snap-in section accommodated in the second groove and connected with the extension section.

Furthermore, the first snap-in section, the second snap-in section and the extension section together form the connection part with a "T"-shaped cross-section; a bottom of the first groove is provided with a boss that extends out of the first groove, and a distance that the boss extends out of the first groove is greater than a depth of the second groove; and a side of the boss that is away from the bottom of the first groove is installed at the second groove, so that the first groove, the second groove and the annular clamping groove together form a clamping groove with a "T"-shaped cross-section.

Furthermore, the lamp holder further includes a fastener; the boss is provided, on a side towards a bottom of the second groove, with a first connection structure; the bottom of the second groove is provided with a second connection structure; the fastener fixedly connects the base body and the pressing plate through the second connection structure and the first connection structure.

Furthermore, the fastener is a screw, the first connection structure is a threaded blind hole, and the second connection structure is a first through hole.

Furthermore, the tap light further includes a charging probe, a battery and a sealing rubber block; the battery is installed in the accommodation cavity and is electrically connected to the main control module; the sealing rubber block is installed in the accommodation cavity and abuts the base body; the base body is provided with a second through hole, an end of the second through hole being directly opposite to the sealing rubber block, and another end thereof being connected to a side of the base body facing away from the accommodation cavity; the sealing rubber block is provided, at a position opposite to the second through hole, with a third through hole; the charging probe is provided in the second through hole and the third through hole in a penetrating manner, a hole wall of the third through hole is elastically pressed against the charging probe, and the charging probe is electrically connected to the battery; and the pressing plate is provided with a second opening for exposing the charging probe.

Furthermore, the base body is provided with a fourth through hole, an end of the fourth through hole being directly opposite to the sealing rubber block, and another end thereof being connected to a side of the base body facing away from the accommodation cavity; the sealing rubber block is provided with a pressing part that penetrates into the fourth through hole, and the pressing part is exposed at the second opening; the main control module includes a switch key that is installed on a side of the pressing part close to the accommodation cavity, and the main control module is used to control the light source assembly to turn on or off according to a switch signal fed back by the switch key.

Furthermore, the tap light further includes a soft light cover, and the soft light cover is arranged outside the light source assembly and connected to the lamp holder.

In a second aspect, the embodiments of the present invention patent provide a tap light, including:

- a lamp holder provided with a main control module, a light source assembly electrically connected to the main control module and a sensor, the main control module being used to control the light source assembly to switch gears or colors based on a control signal detected by the sensor; and a lampshade, a side of the lampshade being provided with a first opening that communicates with an internal space thereof, the lamp holder being installed at the first opening and defining an accommodation cavity together with the lampshade, and the sensor, the main control module and the light source assembly being all located in the accommodation cavity;

wherein the lampshade includes a connection part, and the connection part is adjacent to the first opening and is arranged around the first opening; and the lamp holder is provided with an annular clamping groove, and the connection part is clamped in the annular clamping groove to connect the lamp holder to the lampshade.

Compared with the prior art, the beneficial effect of the tap light provided by the embodiment of the present invention patent is that: the tap light includes a lamp holder and a lampshade. A side of the lampshade is provided with a first opening that communicates with its internal space. The lamp holder is clamped at the first opening of the lampshade. Specifically, the lampshade includes a connection part that is adjacent to the first opening and arranged around the first opening. The lamp holder includes a pressing plate and a base body installed on a side of the pressing plate. An annular clamping groove is defined between base bodies for clamping the connection part. Since the annular clamping groove clamps the connection part, the two will form a seal, effectively preventing water from the external environment from entering the tap light through the gap between the lamp holder and the lampshade. Even if the child puts the tap light into the bathtub or basin while playing, or directly rinses the tap light at the sink, it will not cause the tap light to fail due to water ingress.

DESCRIPTION OF THE DRAWINGS

The specific embodiments of the present invention patent will be further described in detail below in conjunction with the accompanying drawings and examples. In the accompanying drawings.

Each reference number in the figures is.

Figure 1:
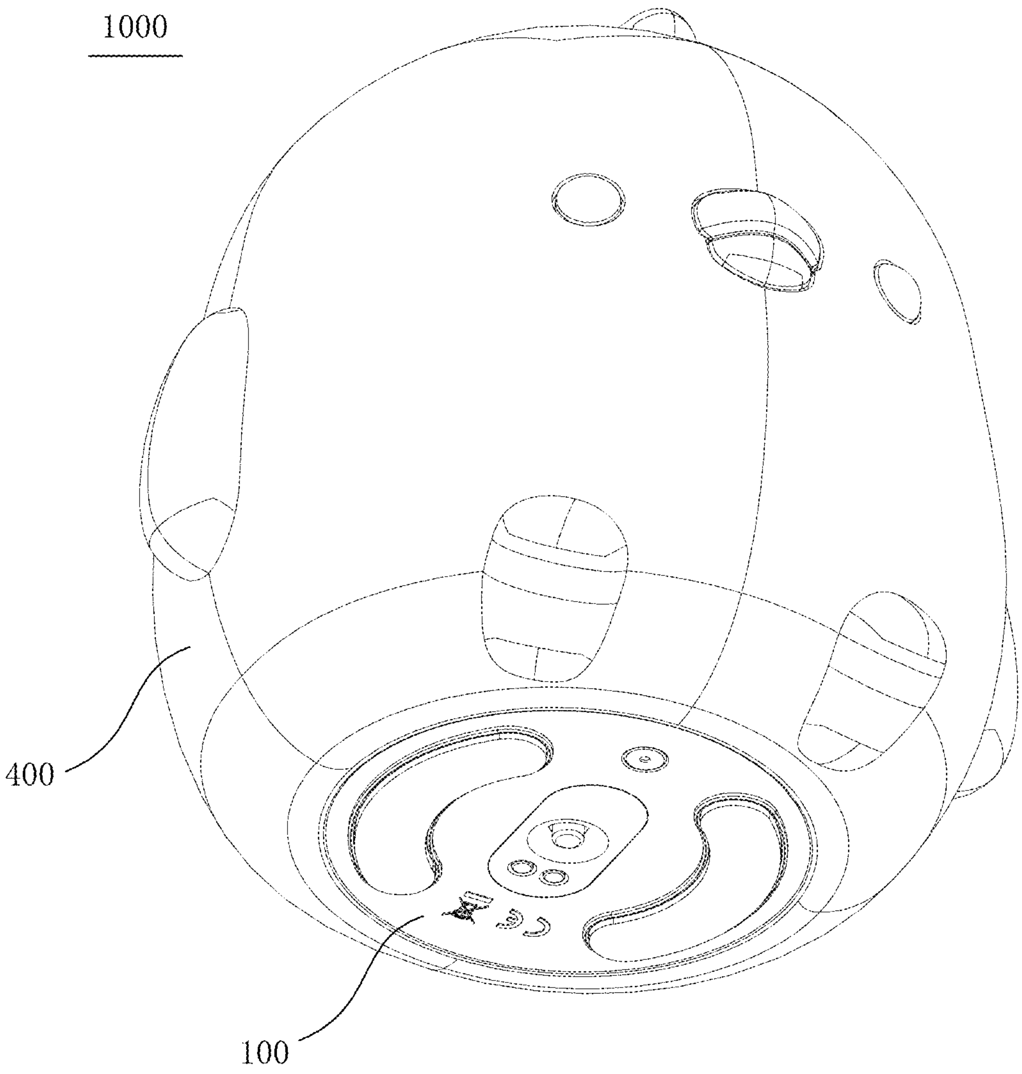
FIG. 1 is a three-dimensional schematic diagram of a tap light provided by an embodiment of the present invention patent.

1000. tap light;

100. Lamp holder; 110. Pressing plate; 111. Second annular protrusion; 112. Second groove; 1121. Second connection structure; 113. Second opening; 120. Base body; 121. First annular protrusion; 122. First groove; 123. Boss; 1231. First connection structure; 124. Second through hole; 125. Fourth through hole; 130. Annular clamping groove;

200. Main control module; 210. Switch key;

300. Light source assembly;

400. Lampshade; 410. First opening; 420. connection part; 421. Extension section; 422. First snap-in section; 423. Second snap-in section;

500. Accommodation cavity;

600. Charging probe;

700. Battery;

800. Sealing rubber block; 810. Third through hole; 820. Pressing part;

900. soft light cover.

DETAILED DESCRIPTION

It should be noted that, as long as there is no conflict, the embodiments and features in the embodiments of this application can be combined with each other. The preferred embodiments of the present invention patent will now be described in detail with reference to the accompanying drawings.

An embodiment of the present invention patent provides a tap light 1000. As shown in FIGS. 1 to 6, the tap light 1000 includes a lamp holder 100 and a lampshade 400. The lamp holder 100 is provided with a main control module 200 and a light source assembly 300 and a sensor that are electrically connected to the main control module 200. The main control module 200 is used to control the light source assembly 300 to switch gears or colors according to the control signal detected by the sensor. One side of the lampshade 400 is provided with a first opening 410 that communicates with its internal space. The lamp holder 100 is installed at the first opening 410 and defines an accommodation cavity 500 together with the lampshade 400. The sensor, the main control module 200 and the light source assembly 300 are all located in the accommodation cavity 500. The lampshade 400 includes a connection part 420, which is adjacent to the first opening 410 and is arranged around the first opening 410. The lamp holder 100 includes a base body 120 and a pressing plate 110 installed on the base body 120. An annular clamping groove 130 is formed between the pressing plate 110 and the base body 120, and the annular clamping groove 130 clamps the connection part 420 to sealingly connect the lamp holder 100 and the lampshade 400.

In this embodiment, the lamp holder 100 includes a pressing plate 110 and a base body 120 installed on one side of the pressing plate 110. Since an annular clamping groove 130 is formed between the pressing plate 110 and the base body 120. The connection part 420 on the lampshade is adjacent to the first opening 410 and is clamped in the annular clamping groove 130. Therefore, the annular clamping groove 130 can cooperate with the connection part 420 to seal the gap between the lamp holder 100 and the lampshade 400, effectively preventing water from the external environment from entering the accommodation cavity 500 through the gap between the lamp holder 100 and the lampshade 400 so that even if the child puts the tap light into the bathtub or basin while playing, or directly rinses the tap light at the sink, it will not cause the tap light to fail due to water ingress.

It should be noted that after the tap light 1000 is tapped, the sensor will be triggered and feedback a control signal to the main control module 200. The main control module 200 controls the light source assembly 300 to switch gears or colors according to the control signal.

There can be many gears, which are not limited in this embodiment. For example, after the tap light 1000 is tapped, the light source assembly 300 will change from the off gear to the always-on gear; or, the light source assembly 300 will change from the always-on gear to the off gear; or the light source assembly 300 will switch between the always-on gear and the flashing gear; or the light source assembly 300 will switch between the low-brightness gear and the high-brightness gear; or the tap light 1000 includes the off gear, the always-on gear, the flashing gear, the low-brightness gear and the high-brightness gear. These gears will switch in sequence when the sensor is triggered multiple times.

There can be many colors, which are not limited in this embodiment. For example, after the tap light 1000 is tapped, the light emitted by the light source assembly 300 will switch between blue and red; or the light emitted by the light source assembly 300 will switch between white and green; or the light source assembly 300 can emit blue light, red light, white light and green light, and these colors switch sequentially when the sensor is triggered multiple times.

Referring to FIGS. 5 to 10, in a specific embodiment, a first annular protrusion 121 is provided on one side of the base body 120 facing the pressing plate 110, and a second annular protrusion 111 is provided on a side of the pressing plate 110 facing the base body 120. The first annular protrusion 121 and the second annular protrusion 111 are spaced apart to form an annular clamping groove 130 between them. The first annular protrusion 121 encloses to form a first groove 122 communicating with the annular clamping groove 130. The second annular protrusions 111 encloses to form a second groove 112 communicating with the annular clamping groove 130, and the connection part 420 is clamped in the annular clamping groove 130.

When the first annular protrusion 121 and the second annular protrusion 111 cooperate to clamp the connection part 420, the connection part 420 will be squeezed and deformed, and a part of the material of the connection part 420 will move toward the direction outside the annular clamping groove 130. In this embodiment, a first groove 122 and a second groove 112 connected with the annular clamping groove 130 are provided outside the annular clamping groove 130, so that when the connection part 420 is deformed, the part of the material can be squeezed to the first groove 122 and the second groove 112.

When the first groove 122 and the second groove 112 are not provided, once the lampshade 400 is pulled, only the annular clamping groove 130 will exert a reverse force on the connection part 420 to limit the connection part 420 from being pulled out. By implementing this embodiment, when the lampshade 400 is pulled, not only the annular clamping groove 130, but also the groove walls of the first groove 122 and the second groove 112, will exert a reverse force on the connection part 420 to limit the connection part 420 from being pulled out. Therefore, implementation of this embodiment can increase the connection stability between the lampshade 400 and the lamp holder 100 and prevent the lampshade 400 from being disconnected from the lamp holder 100 due to the influence of external forces.

Figure 6:
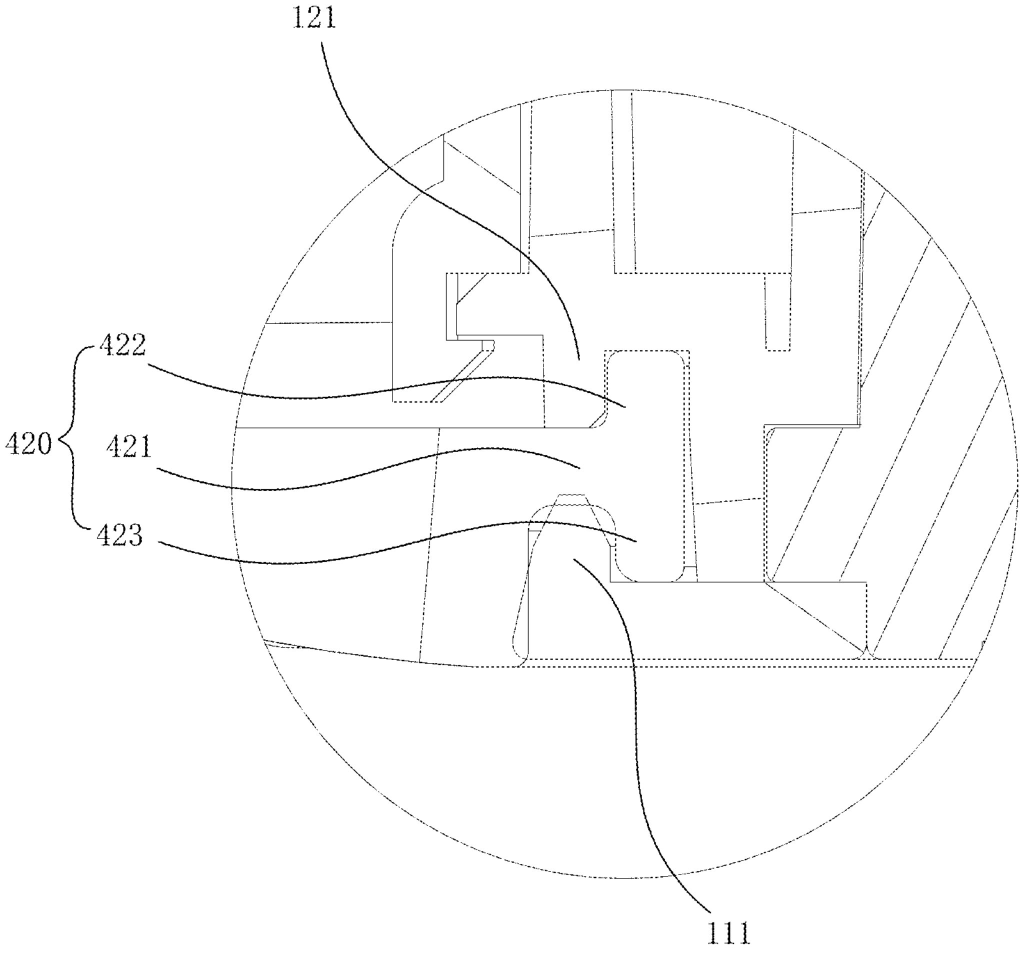
FIG. 6 is a partially enlarged schematic view of the position of a base body in FIG. 5.

Referring to FIG. 6, in a specific embodiment, the connection part 420 includes an extension section 421, a first snap-in section 422 and a second snap-in section 423. The extension section 421 is clamped in the annular clamping groove 130; the first snap-in section 422 is accommodated in the first groove 122 and connected with the extension section 421. The second snap-in section 423 is accommodated in the second groove 112 and connected with the extension section 421.

It is worth mentioning that the first snap-in section 422 and the second snap-in section 423 in this embodiment are provided on the connection part 420, rather than being formed after the connection part 420 is clamped by the annular clamping groove 130.

By implementing this embodiment, when the lampshade 400 is pulled, the first snap-in section 422 will abut the groove wall of the first groove 122, and the second snap-in section 423 will abut the groove wall of the second groove 112. The groove walls of the first groove 122 and the second grooves 112 will provide reverse forces to the first snap-in section 422 and the second snap-in section 423 respectively, thereby limiting the first snap-in section 422 and the second snap-in section 423 from entering the annular clamping groove 130, so that the extension section 421 is stuck in the annular clamping groove 130 and cannot move. It can be seen that implementation of this embodiment can further increase the connection stability between the lampshade 400 and the lamp holder 100 and prevent the lampshade 400 from being disconnected from the lamp holder 100 due to the influence of external forces.

Figure 2:
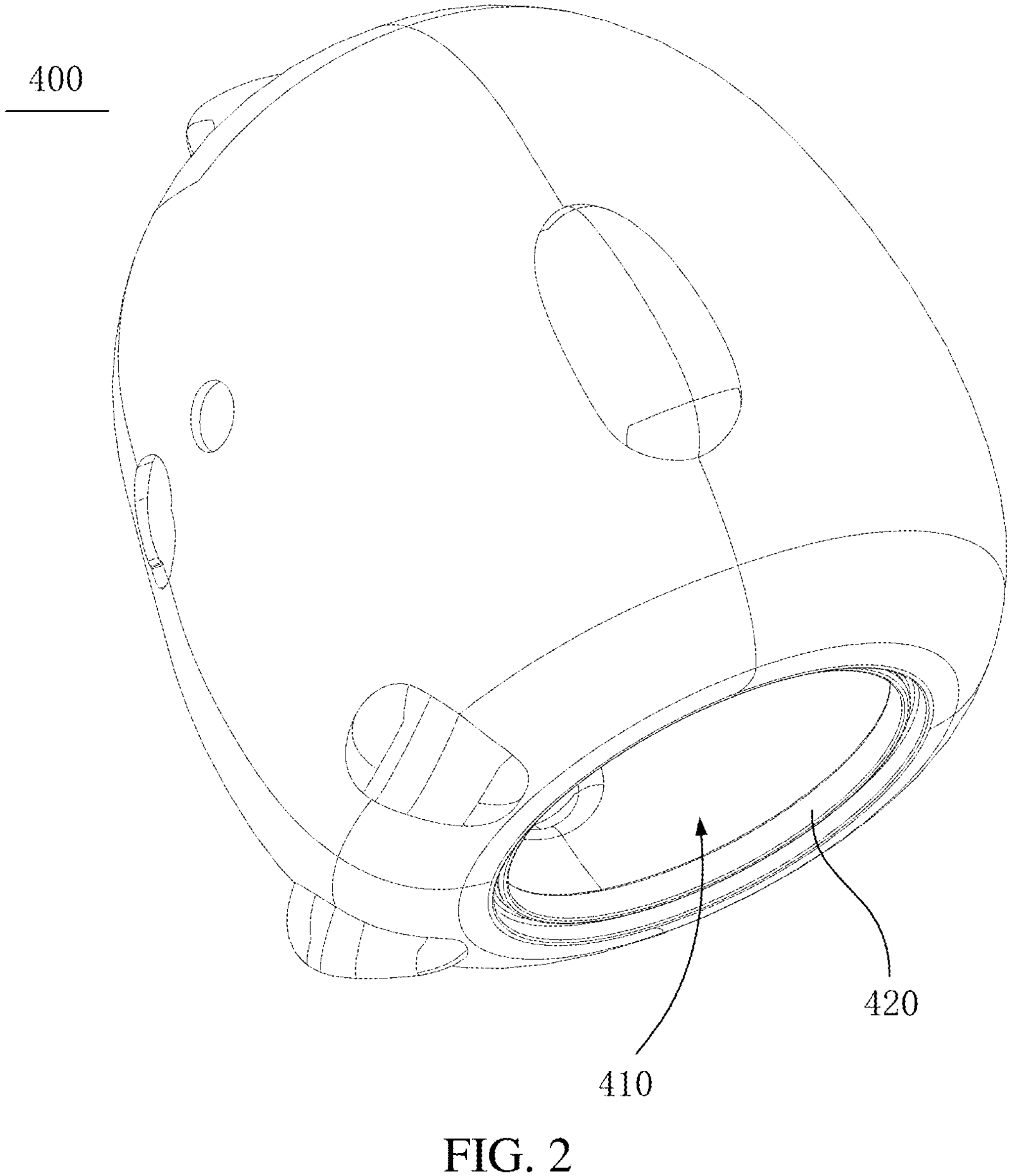
FIG. 2 is a three-dimensional schematic diagram of a lamp holder provided by an embodiment of the present invention patent.
Figure 3:
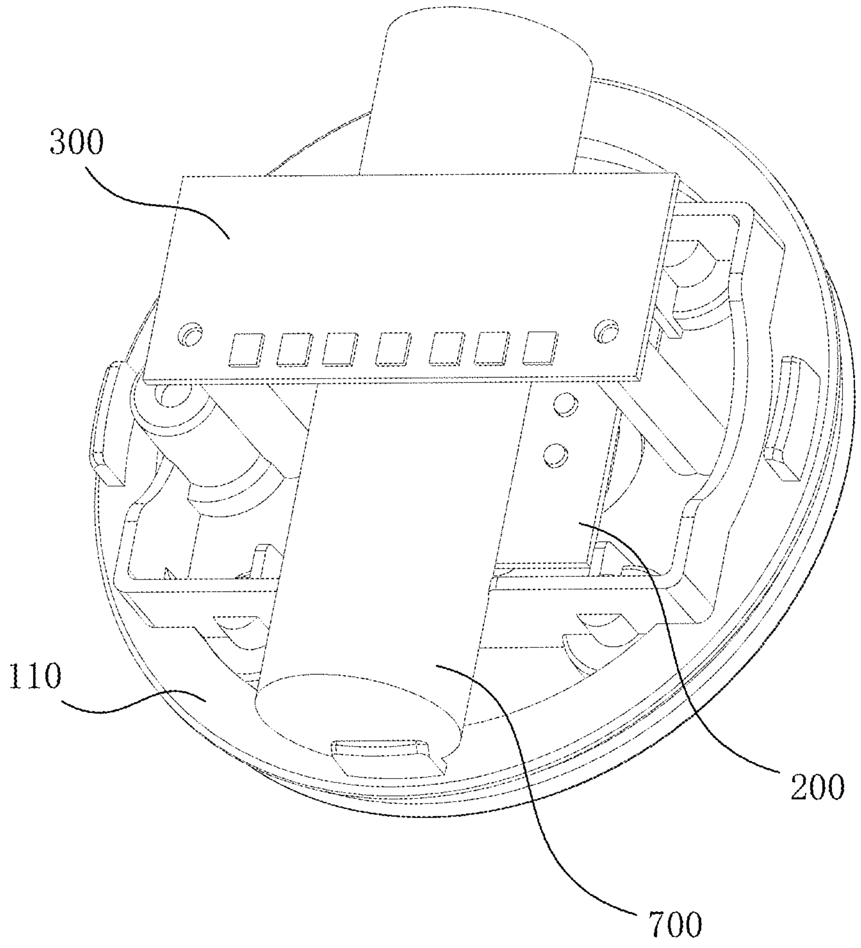
FIG. 3 is a three-dimensional schematic diagram of a tap light provided by an embodiment of the present invention patent without the lampshade and the soft light cover.
Figure 5:
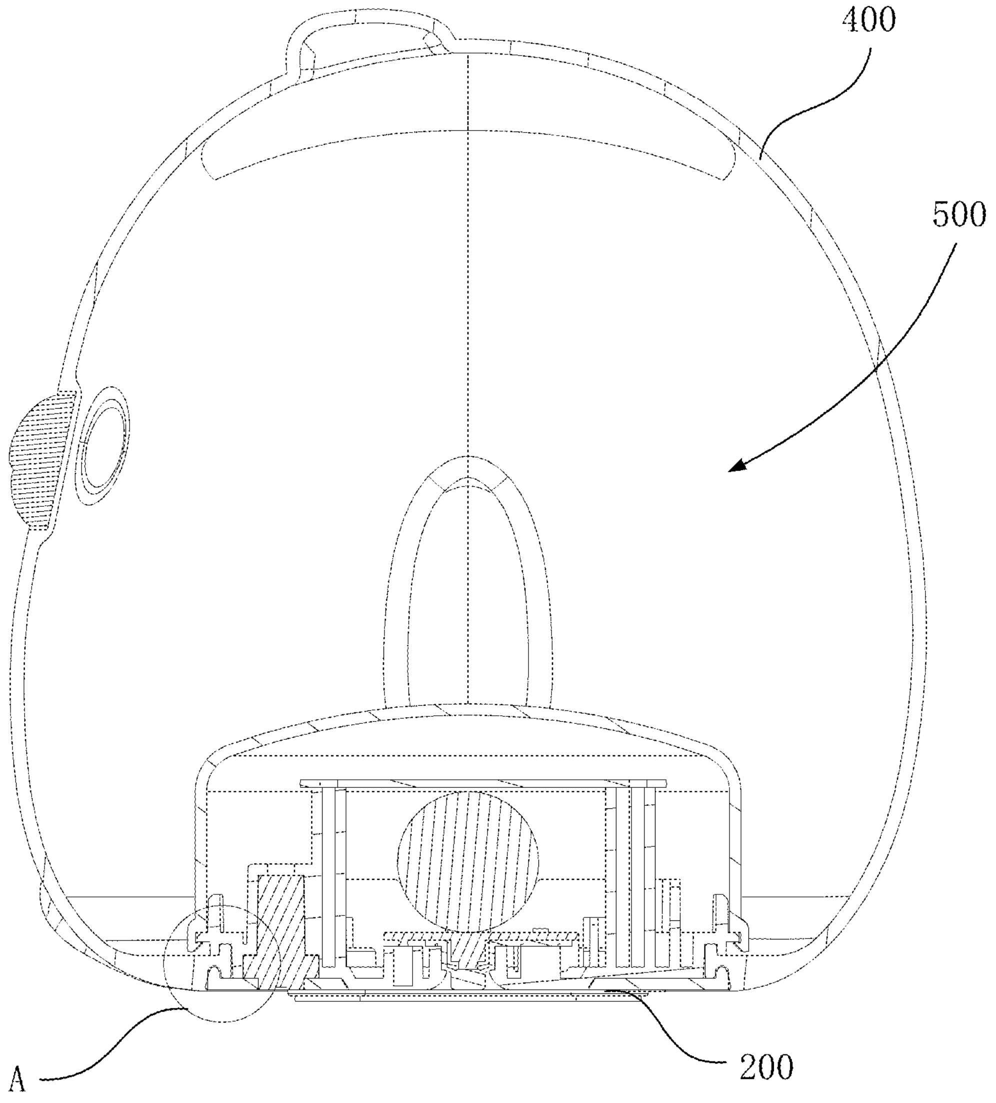
FIG. 5 is a cross-sectional view of a tap light provided by an embodiment of the present invention patent.

It should be noted that there are many specific implementations of the first snap-in section 422 and the second snap-in section 423, as long as the connection stability between the lampshade 400 and the lamp holder 100 can be further increased, this embodiment does not make specific limitations here. Several specific implementations are listed below for reference:

referring to FIGS. 2, 5, and 6, in one embodiment, the first snap-in section 422 and the second snap-in section 423 are annular, so that no matter which direction the lamp holder 100 is pulled, the first snap-in section 422 and the second snap-in section 423 are subjected to force, thereby preventing the extension section 421 from being pulled out of the annular clamping groove 130, further increasing the connection stability between the lampshade 400 and the lamp holder 100.

In one embodiment, there are a plurality of first snap-in sections 422 and second snap-in sections 423, and the plurality of first snap-in sections 422 and second snap-in sections 423 are evenly distributed in the circumferential direction of the first opening 410. In this way, when the user pulls the lamp holder 100 from multiple directions, at least a part of the first snap-in section 422 and the second snap-in section 423 can be subjected to force, thereby preventing the extension section 421 from being pulled out of the annular clamping groove 130, further increasing the connection stability between the lampshade 400 and the lamp holder 100.

Specifically, the number of the first snap-in sections 422 and the second snap-in sections 423 can be four, six, eight, ten, etc., and this embodiment does not make specific limitations here.

Figure 4:
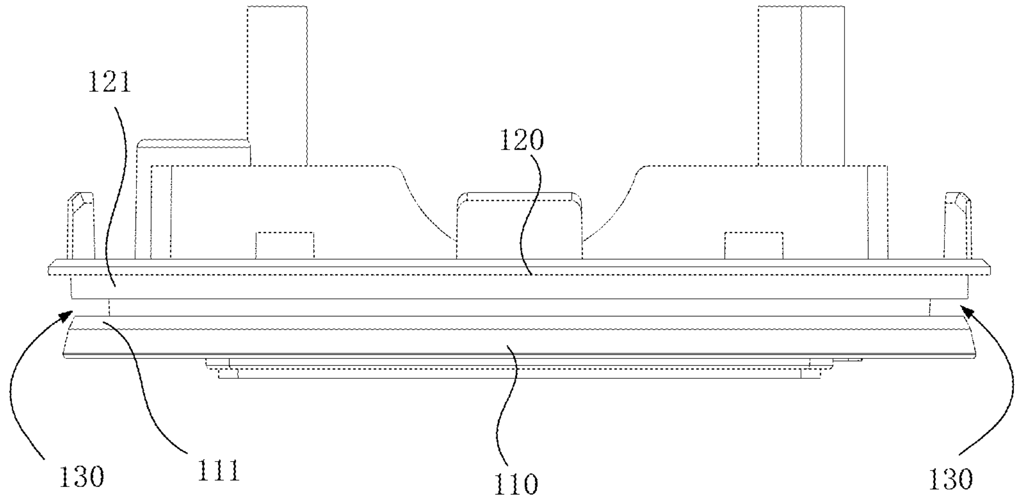
FIG. 4 is a side view of a lamp holder provided by an embodiment of the present invention patent.
Figure 7:
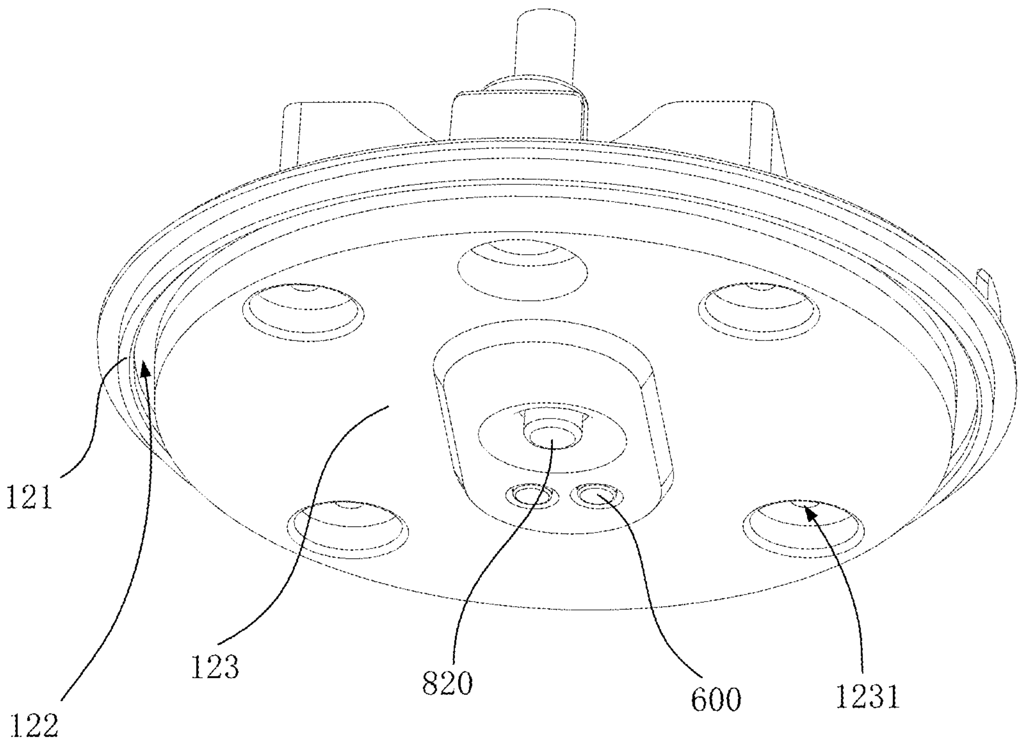
FIG. 7 is a three-dimensional schematic diagram of a base body, sealing block and charging probe provided by an embodiment of the present invention patent.
Figure 8:
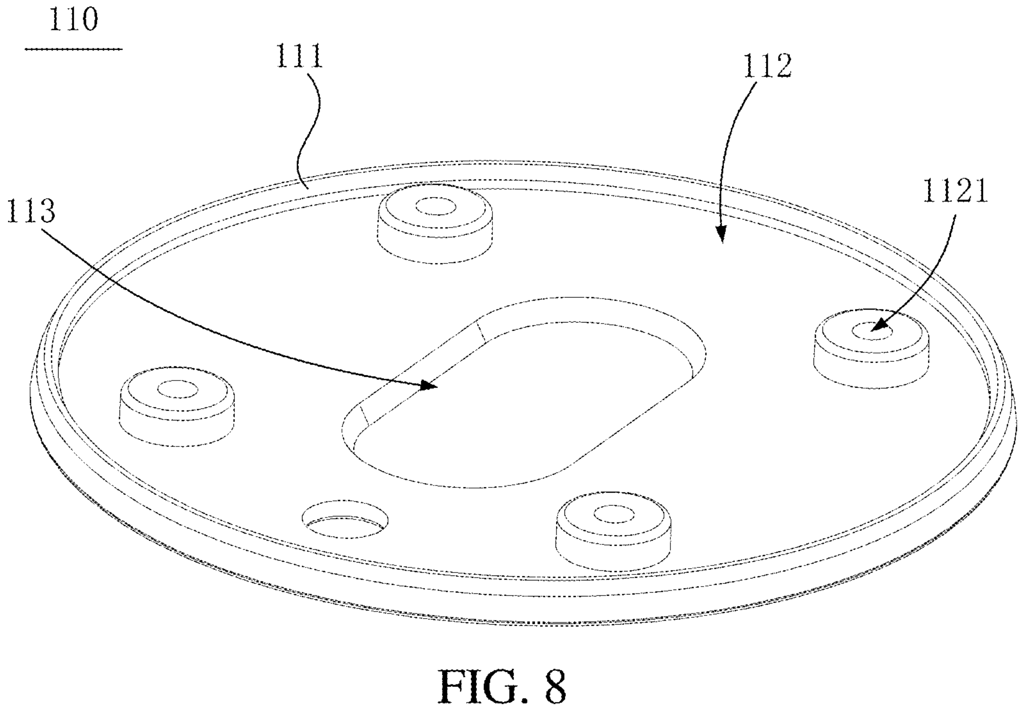
FIG. 8 is a three-dimensional schematic diagram of a pressing plate provided by an embodiment of the present invention patent.
Figure 9:
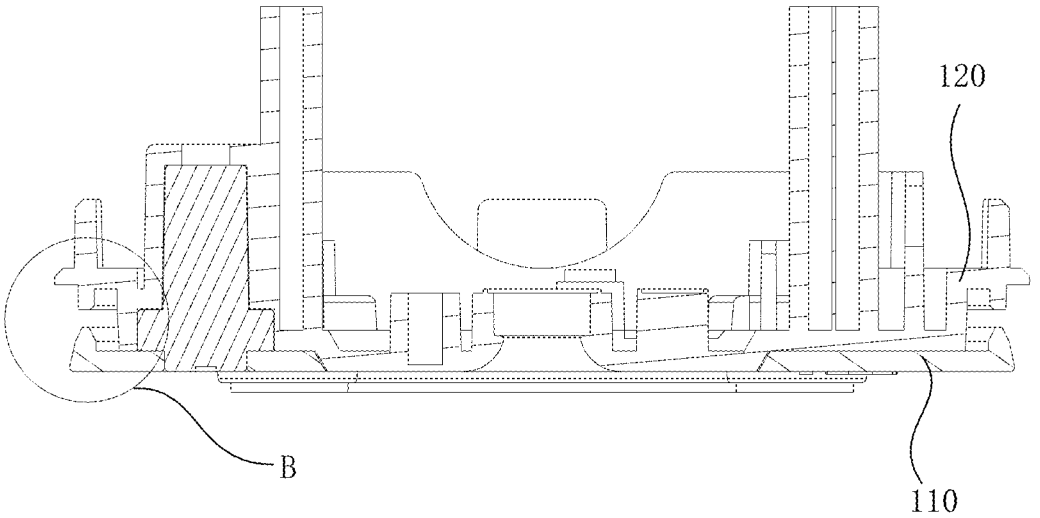
FIG. 9 is a cross-sectional view of a lamp holder provided by an embodiment of the present invention patent.
Figure 10:
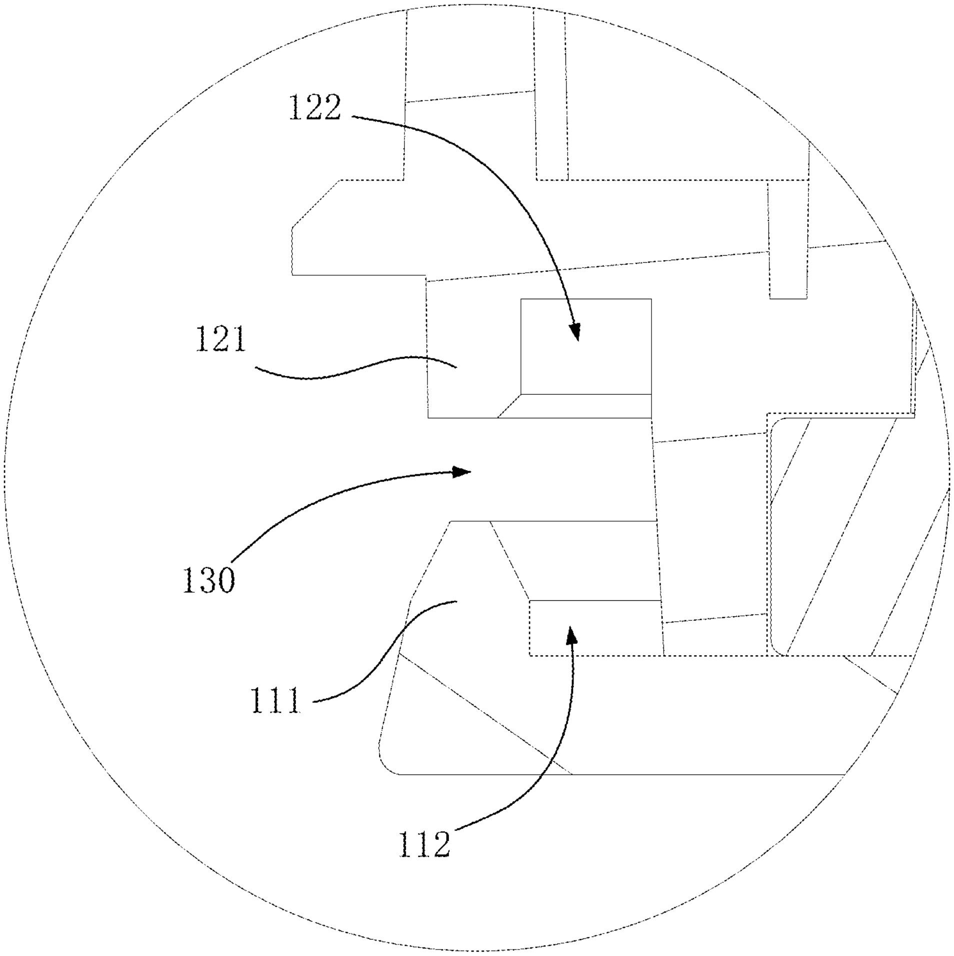
FIG. 10 is a partially enlarged schematic diagram of position B in FIG. 9.

Referring to FIGS. 4, 7, and 8, in one embodiment, the first snap-in section 422, the second snap-in section 423, and the extension section 421 together form a connection part 420 with a "T"-shaped cross-section. A bottom of the first groove 122 is provided with a boss 123 that extends out of the first groove 122, and the distance that the boss 123 extends out of the first groove 122 is greater than the depth of the second groove 112. A side of the boss 123 that is away from the bottom of the first groove 122 is installed at the second groove 112, so that the first groove 122, the second groove 112 and the annular clamping groove 130 together form a clamping groove with a "T"-shaped cross-section.

In this embodiment, the first snap-in section 422, the second snap-in section 423 and the extension section 421 together form a connection part 420 with a "T"-shaped cross-section, while the first groove 122, the second groove 112 and the annular clamping groove 130 together form a clamping groove with a "T"-shaped cross-section. Such an arrangement can better limit the extension section 421 from being pulled out of the annular clamping groove 130, further increasing the connection stability between the lampshade 400 and the lamp holder 100.

Specifically, since the distance that the boss 123 extends out of the first groove 122 is greater than the depth of the second groove 112, the arrangement that the side of the boss 123 that is away from the bottom of the first groove 122 is installed at the second groove 112 means that the boss 123 will be at least partially located outside the first groove 122 and the second groove 112, which also means that the first groove 122 and the second groove 112 will be separated by a certain distance. Since the first groove 122 is formed by enclosing the first annular protrusion 121 and the second groove 112 is formed by enclosing the second annular protrusion 111, the first groove 122 and the second groove 112 being spaced apart means that the first annular protrusion 121 and the second annular protrusion 111 are also spaced apart, so that an annular clamping groove 130 will be formed between the first annular protrusion 121 and the second annular protrusion 111.

Figure 11:
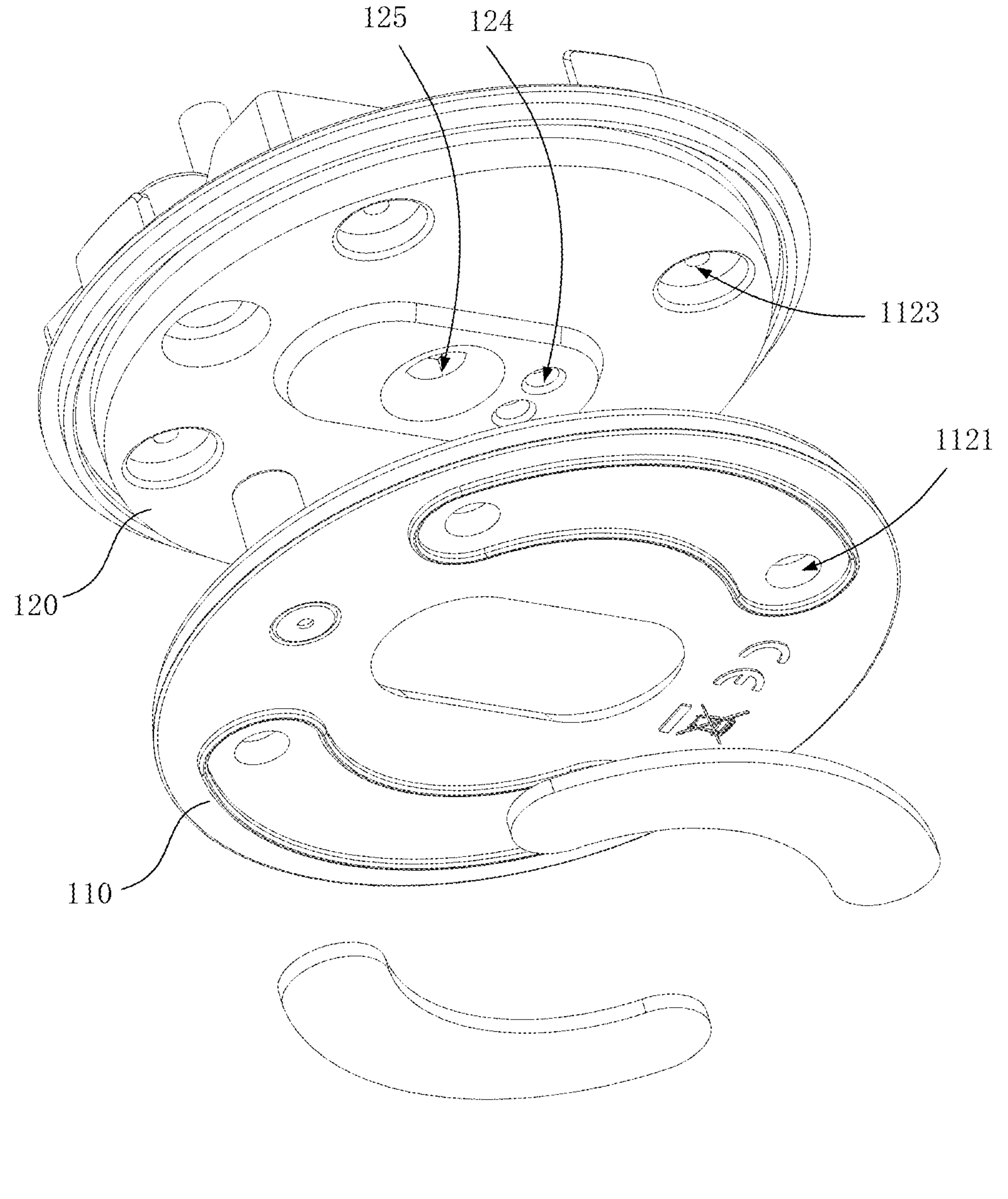
FIG. 11 is an exploded schematic diagram of a lamp holder provided by an embodiment of the present invention patent.

Referring to FIG. 11, in a specific embodiment, the lamp holder 100 also includes fasteners. The boss 123 is provided with a first connection structure 1231 on the side facing the bottom of the second groove 112. The bottom of the second groove 112 is provided with a second connection structure 1121. The fastener fixedly connects the base body 120 and the pressing plate 110 through the second connection structure 1121 and the first connection structure 1231.

In a specific embodiment, the fastener is a screw, the first connection structure 1231 is a threaded blind hole, and the second connection structure 1121 is a first through hole.

In this embodiment, screws are used to connect the pressing plate 110 and the base body 120. This connection method is not only simple and reliable, but also allows for the disassembly of the pressing plate 110 and the base body 120. When the parts in the accommodation cavity 500 are damaged, it can facilitate maintenance and replacement of the parts in the accommodation cavity 500.

In addition, since the pressing plate 110 and the base body 120 can be separated only by using a screwdriver, the user can disassemble the pressing plate 110 and the base body 120 by themselves, and merchants can sell a variety of lampshades 400 of different shapes and colors at the same time for users to replace by themselves. Regularly changing the lampshade 400 can alter the visual effect of the tap light 1000, helping to maintain the freshness towards the tap light 1000. Especially for children, a new appearance can bring great attraction.

Referring to FIGS. 7 to 13, in one embodiment, the tap light 1000 further includes a charging probe 600, a battery 700 and a sealing rubber block 800. The battery 700 is installed in the accommodation cavity 500 and is electrically connected to the main control module 200. The sealing rubber block 800 is installed in the accommodation cavity 500 and abuts the base body 120. The base body 120 is provided with a second through hole 124.

One end of the second through hole 124 is directly opposite to the sealing rubber block, and the other end is connected to a side of the base body 120 facing away from the accommodation cavity 500. The sealing rubber block 800 is provided, at a position opposite to the second through hole 124, with a third through hole 810. The charging probe 600 is provided in the second through hole 124 and the third through hole 810 in a penetrating manner and a hole wall of the third through hole 810 is elastically pressed against the charging probe 600. The charging probe 600 is electrically connected to the battery 700; and the pressing plate 110 is provided with a second opening 113 for exposing the charging probe 600.

In order to enable the tap light 1000 to be used for a long time and multiple times, the tap light 1000 in this embodiment is provided with a battery 700 and a charging probe 600 for charging the battery 700. Since the charging probe 600 needs to be exposed outside the tap light 1000, in order to achieve a waterproof effect, the tap light 1000 in this embodiment is also provided with a sealing rubber block 800. Specifically, the sealing rubber block 800 is installed in the accommodation cavity 500 and abuts the base body 120, so that a seal is formed between the sealing rubber block 800 and the base body 120. The base body 120 is provided with a second through hole 124. One end of the second through hole 124 is directly opposite to the sealing rubber block, and the other end is connected to a side of the base body 120 facing away from the accommodation cavity 500. The sealing rubber block 800 is provided, at a position opposite to the second through hole 124, with a third through hole 810. The charging probe 600 is provided in the second through hole 124 and the third through hole 810 in a penetrating manner and a hole wall of the third through hole 810 is elastically pressed against the charging probe 600. In these ways, a seal is formed between the sealing rubber block 800 and the charging probe 600. With this arrangement, water from the external environment cannot enter the accommodation cavity 500 from between the sealing rubber block 800 and the base body 120 or between the sealing rubber block 800 and the charging probe 600.

Figure 12:
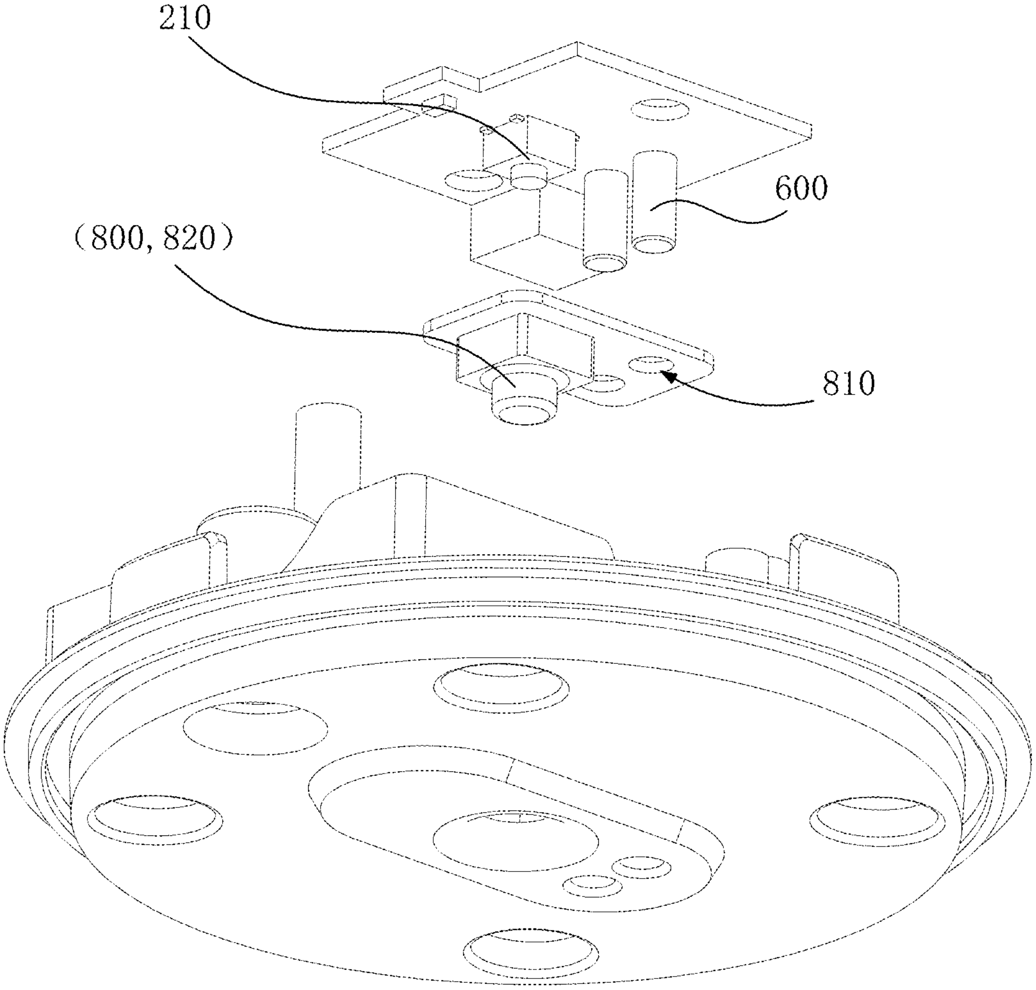
FIG. 12 is an exploded schematic diagram of a base body, main control module, charging probe and sealing rubber block provided by an embodiment of the present invention patent.
Figure 13:
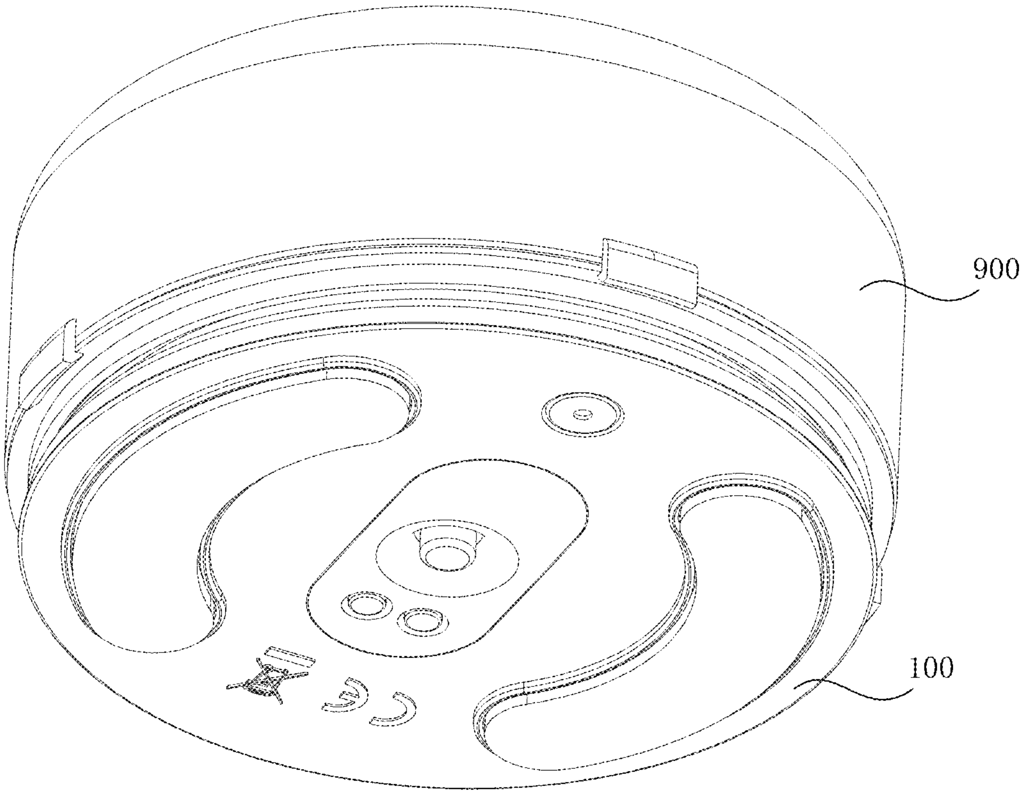
FIG. 13 is a three-dimensional schematic diagram of a tap light provided by an embodiment of the present invention patent without the lampshade.

Referring to FIGS. 11 to 13, in one embodiment, the base body 120 is provided with a fourth through hole 125. One end of the fourth through hole 125 is directly opposite to the sealing rubber block, and the other end is connected to a side of the base body 120 facing away from the accommodation cavity 500. The sealing rubber block 800 is provided with a pressing part 820 that penetrates into the fourth through hole 125, and the pressing part 820 is exposed at the second opening 113. The main control module includes a switch key 210 that is installed on a side of the pressing part 820 close to the accommodation cavity 500, and the main control module 200 is used to control the light source assembly 300 to turn on or off according to the switch signal fed back by the switch key 210.

Specifically, when the user presses the pressing part 820, the pressing part 820 will deform and trigger the switch key 210 on the main control module 200. When the switch key 210 is triggered, the main control module 200 will turn on or off the light source assembly 300 according to the switch signal fed back by the switch key 210. Since the sealing rubber block 800 abuts the base body 120, a seal will be formed between the sealing rubber block 800 and the base body 120. Therefore, implementation of this embodiment will not cause water from the external environment to enter the accommodation cavity 500 from between the sealing rubber block 800 and the base body 120.

Referring to FIG. 13, in one embodiment, the tap light 1000 further includes a soft light cover 900. The soft light cover 900 is arranged outside the light source assembly 300 and connected to the lamp holder 100.

Specifically, the light emitted by the light source assembly 300 will become softer and more uniform after passing through the soft light cover 900. Therefore, arranging the soft light cover 900 can make the tap light 1000 more aesthetically pleasing.

The present invention patent also provides a tap light. As shown in FIGS. 1 to 6, the tap light 1000 includes a lamp holder 100 and a lampshade 400. The lamp holder 100 is provided with a main control module 200 and a light source assembly 300 and a sensor that are electrically connected to the main control module 200. The main control module 200 is used to control the light source assembly 300 to switch gears or colors according to the control signal detected by the sensor. One side of the lampshade 400 is provided with a first opening 410 that communicates with its internal space. The lamp holder 100 is installed at the first opening 410 and defines an accommodation cavity 500 together with the lampshade 400. The sensor, the main control module 200 and the light source assembly 300 are all located in the accommodation cavity 500. The lampshade 400 includes a connection part 420, which is adjacent to the first opening 410 and is arranged around the first opening 410. The lamp holder 100 is provided with an annular clamping groove 130, and the annular clamping groove 130 clamps the connection part 420 to connect the lamp holder 100 to the lampshade 400, which effectively prevents water from the external environment from entering the accommodation cavity 500 from the gap between the lamp holder 100 and the lampshade 400. Even if the child puts the tap light 1000 into the bathtub or basin while playing, or directly rinses the tap light 1000 at the sink, it will not cause the tap light 1000 to fail due to water ingress.

It should be understood that the above embodiments are only used to illustrate the technical solutions of the present invention patent, but not to limit them. Those skilled in the art can modify the technical solutions disclosed in the above embodiments, or make equivalent substitutions for some of the features thereof. All these modifications and substitutions shall fall within the protection scope of the appended claims of the present invention patent.

What is claimed is:

1. A tap light, characterized by comprising:

a lamp holder provided with a main control module, a light source assembly and a sensor electrically connected to the main control module, the main control module being used to control the light source assembly to switch gears or colors based on a control signal detected by the sensor; and a lampshade, a side of the lampshade being provided with a first opening that communicates with an internal space thereof, the lamp holder being installed at the first opening and defining an accommodation cavity together with the lampshade, and the sensor, the main control module and the light source assembly being all located in the accommodation cavity;

wherein the lampshade comprises a connection part, and the connection part is adjacent to the first opening and is arranged around the first opening; and the lamp holder comprises a base body and a pressing plate installed on the base body, and an annular clamping groove is formed between the pressing plate and the base body, the annular clamping groove clamping the connection part to sealingly connect the lamp holder and the lampshade;

the connection part has a "T"-shaped cross-section; and the annular clamping groove has a "T"-shaped cross-section.

2. The tap light according to claim 1, characterized in that the base body is provided, on a side facing the pressing plate, with a first annular protrusion;

the pressing plate is provided, on a side facing the base body, with a second annular protrusion;

the first annular protrusion and the second annular protrusion are spaced apart to form the annular clamping groove between the two;

the first annular protrusion encloses to form a first groove communicating with the annular clamping groove;

the second annular protrusion encloses to form a second groove communicating with the annular clamping groove; and the connection part is clamped in the annular clamping groove.

3. The tap light according to claim 2, characterized in that the connection part comprises:

an extension section clamped in the annular clamping groove;

a first snap-in section accommodated in the first groove and connected with the extension section; and a second snap-in section accommodated in the second groove and connected with the extension section.

4. The tap light according to claim 3, characterized in that the first snap-in section, the second snap-in section and the extension section together form the connection part;

a bottom of the first groove is provided with a boss that extends out of the first groove, and a distance that the boss extends out of the first groove is greater than a depth of the second groove; and a side of the boss that is away from the bottom of the first groove is installed at the second groove, so that the first groove, the second groove and the annular clamping groove together form a clamping groove with a "T"-shaped cross-section.

5. The tap light according to claim 4, characterized in that the lamp holder further comprises a fastener;

the boss is provided, on a side towards a bottom of the second groove, with a first connection structure;

the bottom of the second groove is provided with a second connection structure;

the fastener fixedly connects the base body and the pressing plate through the second connection structure and the first connection structure.

6. The tap light according to claim 5, characterized in that the fastener is a screw, the first connection structure is a threaded blind hole, and the second connection structure is a first through hole.

7. The tap light according to claim 1, characterized in that, the tap light further comprises a charging probe, a battery and a sealing rubber block;

the battery is installed in the accommodation cavity and is electrically connected to the main control module;

the sealing rubber block is installed in the accommodation cavity and abuts the base body;

the base body is provided with a second through hole, an end of the second through hole being directly opposite to the sealing rubber block, and another end thereof being connected to a side of the base body facing away from the accommodation cavity;

the sealing rubber block is provided, at a position opposite to the second through hole, with a third through hole;

the charging probe is provided in the second through hole and the third through hole in a penetrating manner, a hole wall of the third through hole is elastically pressed against the charging probe, and the charging probe is electrically connected to the battery; and the pressing plate is provided with a second opening for exposing the charging probe.

8. The tap light according to claim 2, characterized in that, the tap light further comprises a charging probe, a battery and a sealing rubber block;

the battery is installed in the accommodation cavity and is electrically connected to the main control module;

the sealing rubber block is installed in the accommodation cavity and abuts the base body;

the base body is provided with a second through hole, an end of the second through hole being directly opposite to the sealing rubber block, and another end thereof being connected to a side of the base body facing away from the accommodation cavity;

the sealing rubber block is provided, at a position opposite to the second through hole, with a third through hole;

the charging probe is provided in the second through hole and the third through hole in a penetrating manner, a hole wall of the third through hole is elastically pressed against the charging probe, and the charging probe is electrically connected to the battery; and the pressing plate is provided with a second opening for exposing the charging probe.

9. The tap light according to claim 3, characterized in that, the tap light further comprises a charging probe, a battery and a sealing rubber block;

the battery is installed in the accommodation cavity and is electrically connected to the main control module;

the sealing rubber block is installed in the accommodation cavity and abuts the base body;

the base body is provided with a second through hole, an end of the second through hole being directly opposite to the sealing rubber block, and another end thereof being connected to a side of the base body facing away from the accommodation cavity;

the sealing rubber block is provided, at a position opposite to the second through hole, with a third through hole;

the charging probe is provided in the second through hole and the third through hole in a penetrating manner, a hole wall of the third through hole is elastically pressed against the charging probe, and the charging probe is electrically connected to the battery; and the pressing plate is provided with a second opening for exposing the charging probe.

10. The tap light according to claim 4, characterized in that, the tap light further comprises a charging probe, a battery and a sealing rubber block;

the battery is installed in the accommodation cavity and is electrically connected to the main control module;

the sealing rubber block is installed in the accommodation cavity and abuts the base body;

the base body is provided with a second through hole, an end of the second through hole being directly opposite to the sealing rubber block, and another end thereof being connected to a side of the base body facing away from the accommodation cavity;

the sealing rubber block is provided, at a position opposite to the second through hole, with a third through hole;

the charging probe is provided in the second through hole and the third through hole in a penetrating manner, a hole wall of the third through hole is elastically pressed against the charging probe, and the charging probe is electrically connected to the battery; and the pressing plate is provided with a second opening for exposing the charging probe.

11. The tap light according to claim 7, characterized in that the base body is provided with a fourth through hole, an end of the fourth through hole being directly opposite to the sealing rubber block, and another end thereof being connected to a side of the base body facing away from the accommodation cavity;

the sealing rubber block is provided with a pressing part that penetrates into the fourth through hole, and the pressing part is exposed at the second opening;

the main control module comprises a switch key that is installed on a side of the pressing part close to the accommodation cavity, and the main control module is used to control the light source assembly to turn on or off according to a switch signal fed back by the switch key.

12. The tap light according to claim 8, characterized in that the base body is provided with a fourth through hole, an end of the fourth through hole being directly opposite to the sealing rubber block, and another end thereof being connected to a side of the base body facing away from the accommodation cavity;

the sealing rubber block is provided with a pressing part that penetrates into the fourth through hole, and the pressing part is exposed at the second opening;

the main control module comprises a switch key that is installed on a side of the pressing part close to the accommodation cavity, and the main control module is used to control the light source assembly to turn on or off according to a switch signal fed back by the switch key.

13. The tap light according to claim 9, characterized in that the base body is provided with a fourth through hole, an end of the fourth through hole being directly opposite to the sealing rubber block, and another end thereof being connected to a side of the base body facing away from the accommodation cavity;

the sealing rubber block is provided with a pressing part that penetrates into the fourth through hole, and the pressing part is exposed at the second opening;

the main control module comprises a switch key that is installed on a side of the pressing part close to the accommodation cavity, and the main control module is used to control the light source assembly to turn on or off according to a switch signal fed back by the switch key.

14. The tap light according to claim 10, characterized in that the base body is provided with a fourth through hole, an end of the fourth through hole being directly opposite to the sealing rubber block, and another end thereof being connected to a side of the base body facing away from the accommodation cavity;

the sealing rubber block is provided with a pressing part that penetrates into the fourth through hole, and the pressing part is exposed at the second opening;

the main control module comprises a switch key that is installed on a side of the pressing part close to the accommodation cavity, and the main control module is used to control the light source assembly to turn on or off according to a switch signal fed back by the switch key.

15. The tap light according to claim 1, characterized in that the tap light further comprises a soft light cover, and the soft light cover is arranged outside the light source assembly and connected to the lamp holder.

16. The tap light according to claim 2, characterized in that the tap light further comprises a soft light cover, and the soft light cover is arranged outside the light source assembly and connected to the lamp holder.

17. The tap light according to claim 3, characterized in that the tap light further comprises a soft light cover, and the soft light cover is arranged outside the light source assembly and connected to the lamp holder.

18. The tap light according to claim 4, characterized in that the tap light further comprises a soft light cover, and the soft light cover is arranged outside the light source assembly and connected to the lamp holder.

19. A tap light, characterized by comprising:

a lamp holder provided with a main control module, a light source assembly electrically connected to the main control module and a sensor, the main control module being used to control the light source assembly to switch gears or colors based on a control signal detected by the sensor; and a lampshade, a side of the lampshade being provided with a first opening that communicates with an internal space thereof, the lamp holder being installed at the first opening and defining an accommodation cavity together with the lampshade, and the sensor, the main control module and the light source assembly being all located in the accommodation cavity;

wherein the lampshade comprises a connection part, and the connection part is adjacent to the first opening and is arranged around the first opening; and the lamp holder is provided with an annular clamping groove, and the connection part is clamped in the annular clamping groove to connect the lamp holder to the lampshade;

the connection part has a "T"-shaped cross-section; and the annular clamping groove has a "T"-shaped cross-section.

* * * * *